United States Patent [19]

Schnear

[11] 3,954,025

[45] May 4, 1976

[54] BRIDGE CONSTRUCTION FOR DISPENSING APPARATUS

[75] Inventor: Donald M. Schnear, Corona del Mar, Calif.

[73] Assignee: Morehouse Industries, Inc., Fullerton, Calif.

[22] Filed: Oct. 16, 1974

[21] Appl. No.: 515,295

[52] U.S. Cl. .................................. 74/611; 259/108

[51] Int. Cl.[2] .......................................... F16H 57/02

[58] Field of Search .................. 74/216.5, 219, 606, 74/611 R; 259/107, 108, DIG. 26, DIG. 38, DIG. 28, DIG. 29, DIG. 39, 122

[56] References Cited

UNITED STATES PATENTS

| | | | |
|---|---|---|---|
| 781,406 | 1/1905 | Devereux | 259/107 |
| 2,210,135 | 8/1940 | Tautz et al. | 74/611 |
| 2,843,169 | 7/1958 | Stein | 259/107 |
| 3,044,750 | 7/1962 | Schmitt, Jr. | 259/108 |

*Primary Examiner*—Samuel Scott
*Assistant Examiner*—A. Russell Burke
*Attorney, Agent, or Firm*—Knobbe, Martens, Olson, Hubbard & Bear

[57] ABSTRACT

A bridge for supporting a dispersing impeller and drive shaft with the bridge being formed primarily of a single sheet of steel plate bent so as to form a hollow rectangular cross-section. The impeller shaft is mounted by bearings attached to the upper and lower walls of the bridge, for pedestal mounting of the bridge or for being supported directly on the dispersing container.

2 Claims, 5 Drawing Figures

BRIDGE CONSTRUCTION FOR DISPENSING APPARATUS

This invention relates to industrial apparatus for mixing or dispersing particles with a liquid, and more particularly relates to an improved bridge construction providing significant engineering and manufacturing advantages.

Industrial apparatus for dispersing, dissolving, emulsifying, or deagglomerating material in liquids is utilized in many industries. Such apparatus is employed for handling a large variety of materials such as paints, plastics, inks, pharmaceuticals and other liquids. The apparatus represents a considerable capital investment to the user and is expected to have a long useful life. Consequently, such apparatus has historically been very ruggedly built and typically on somewhat of a job lot basis. Also contributing to this is the fact that most equipment is specially designed to meet the requirements of a particular customer. There has been little standardization in the engineering and manufacturing of such apparatus.

Typically the bridge construction which supports the dispersing or mixing impeller has been formed of a heavy, steel horizontal support plate to which is welded heavy vertically extending side panels. Usually the structure is then further strengthened by a plurality of shorter vertically extending gussets or struts which are welded to the horizontal support plate and the vertical side panels. Both the horizontal plate and the side panels require separate cutting operations of rectangular sheet into irregular shapes plus a large amount of man hours for welding operations is necessary to join the components. This is not only expensive because of the time involved, but also requires considerable skill and makes quality control difficult. A cover structure is also usually provided by being attached to the upper portions of the side panels. This involves a variety of different fabricating steps on metal usually lighter gauge than the other components.

Another shortcoming of the present largely welded bridge construction utilized is that much of the apparatus is essentially custom made with the result that accuracy and uniformity is difficult and repair and replacement must also be customized. The nature of the industry is such that the customer will look to the manufacturer for repair and replacement service many years after the purchase of the original equipment. Thus, the original manufacturer must either maintain accurate records of the manufacturing detail of all equipment sold or else send personnel to the site of the equipment for getting precise data regarding the required repairs.

The dispersing or mixing impeller shaft is supported on the bridge by a bearing support structure attached to the horizontal plate. Such an arrangement leaves the support of the impeller shaft somewhat of a stress point in the design, because the shaft is subjected to considerable side load in the heavy mixing operations to which it is subjected.

It is desirable that the design and manufacture of equipment of this type be simplified and improved to reduce costs both in manufacture and repair while maintaining or improving the necessary reliability and durability of the equipment. In accordance with the present invention, this is accomplished by utilizing a bridge design that eliminates much of the hand welding operations of the prior art and standardizes the dimensions and manufacture of a particular size unit. The new construction also improves and strengthens the mounting arrangement for the impeller shaft. The same basic construction may be employed for a variety of models whether they be pedestal supported with or without bridge movement, container supported, or have variable speed capability.

In accordance with this invention, the bridge is made basically from a single sheet of flat steel plate which is formed into a generally box shape rectangular cross-section. Equipment for forming heavy sheets of steel is quite expensive. The manufacturer of the dispersing apparatus typically would not wish to invest in such expensive and specialized equipment. However, the supplier of the sheets of steel plate typically has this equipment. Thus, it is practical to have the supplier of the steel plate perform the bending operation. The box shape is sufficiently strong such that no welding steps for strengthening the structure are required. All that is required are steps to modify the bridge to receive the components which it supports; and in the case of pedestal mounted units, to modify the bridge so as to be attached to the pedestal. The arrangement is particularly advantageous for supporting the impeller shaft by the spaced upper and lower walls of the bridge. Spacing the bearings lends considerable stability that is not provided by bearing mounts hung from a single horizontal support plate.

Further features and advantages of the invention will become apparent with reference to the following drawings in which.

Figure 1:
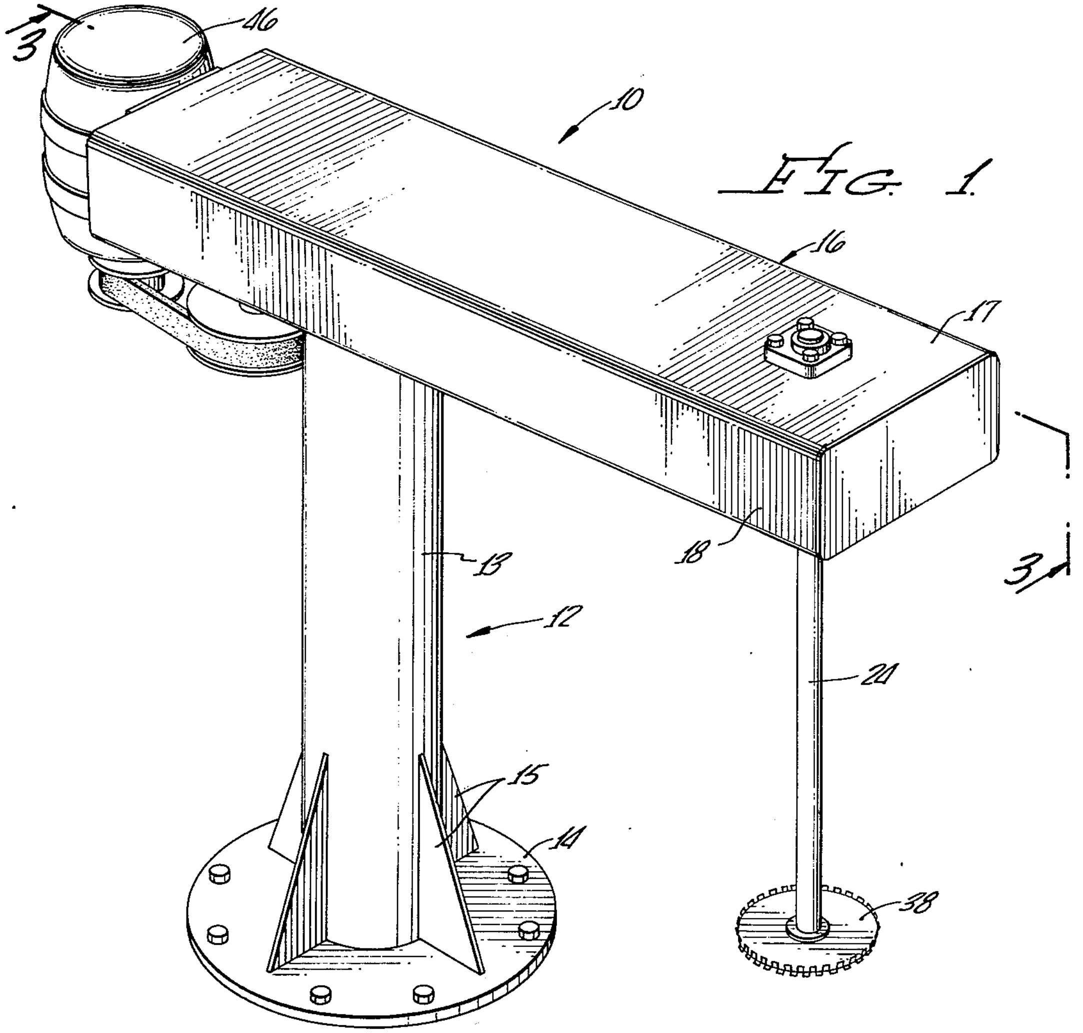
FIG. 1 is a perspective view of a pedestal mounted industrial dispersing apparatus employing the new bridge construction.

Referring first to FIG. 1, the dispersing or mixing apparatus shown therein includes an overhead bridge assembly 10 supported on a pedestal 12 including a vertical column 13 attached to a base 14 by suitable means including a series of vertically extended gussets 15.

Figure 2:
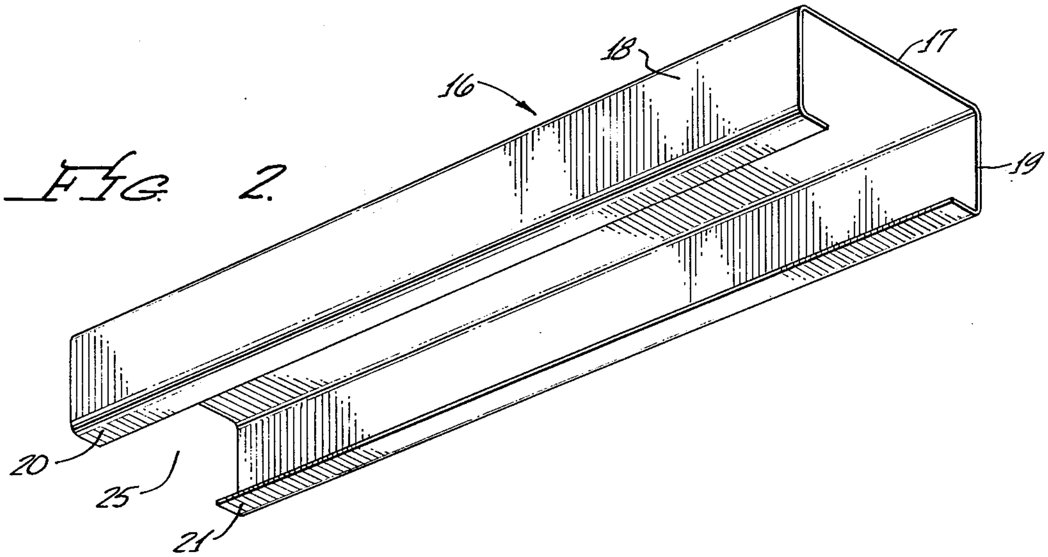
FIG. 2 is a perspective view of the single sheet of steel plate after it has been formed into its box configuration.

The heart of the present invention is the bridge member 16 which as seen from FIG. 2 is formed from a single sheet of steel plate that has been bent into an elongated, open ended, box shape with a generally rectangular cross-section. More specifically, this includes an upper horizontal wall 17 formed integrally with two depending side walls 18 and 19 and a lower horizontal, partial wall formed by two inwardly extending flanges 20 and 21 respectively attached to the side walls 18 and 19. The flanges can be extended further inwardly if desired, however, the arrangement illustrated provides an elongated gap 25 which is convenient for providing access to the interior of the bridge. While industrial mixers and dispersing apparatus can be formed in whatever size is desired, typically they are relatively large units for handling volume processing with the result that the bridge member is formed of a relatively heavy metal plate. As indicated above, the equipment necessary to bend thick metal plate is relatively expensive so that it is not practical for all users of such material to have the equipment. However, the fabricator of such plate typically has the equipment such that the bridge member may be furnished by the metal supplier in the form as shown in FIG. 2.

Figure 3:
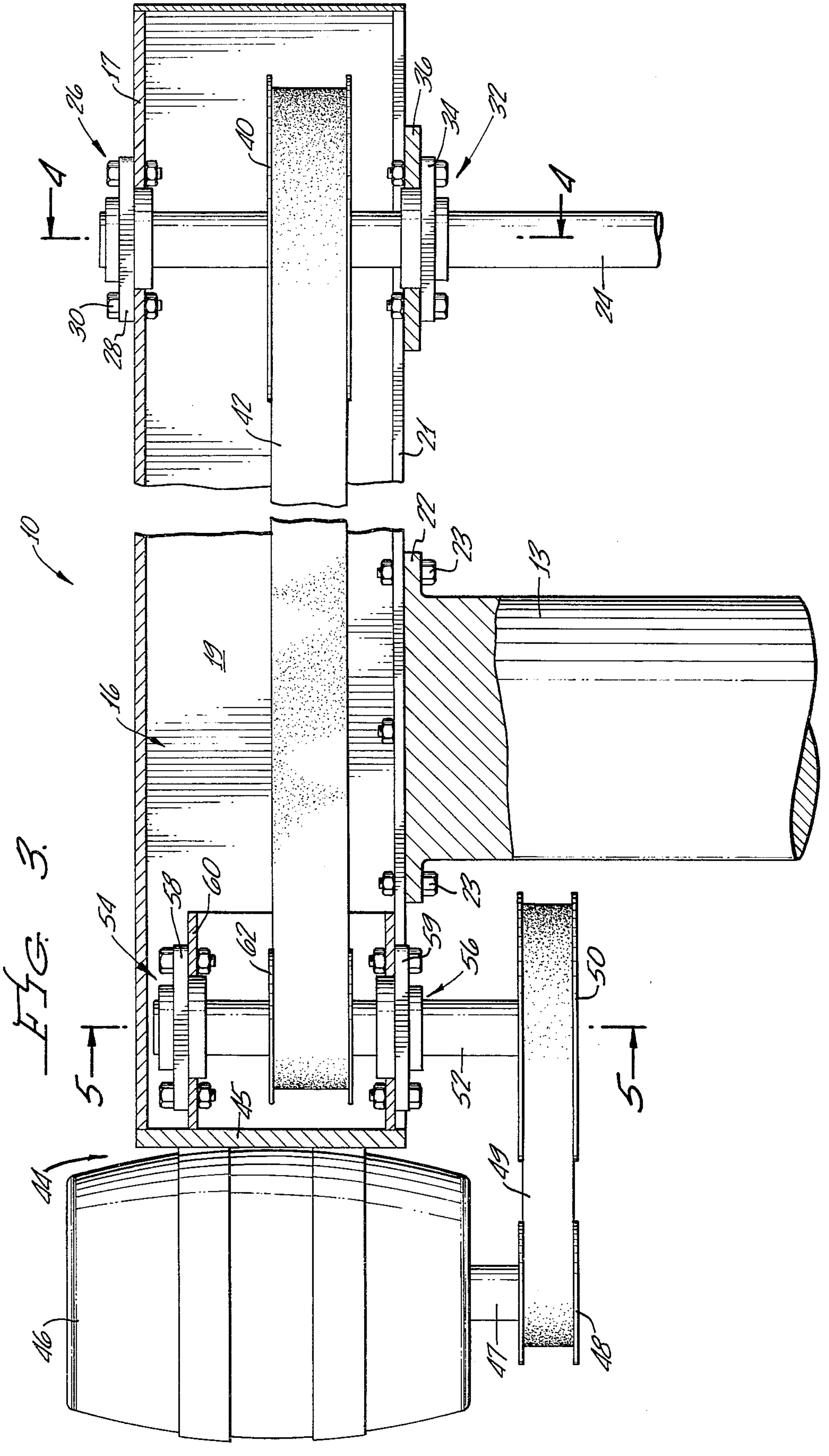
FIG. 3 is a broken cross-sectional view of the dispersing apparatus on line 3—3 of FIG. 1.
Figure 4:
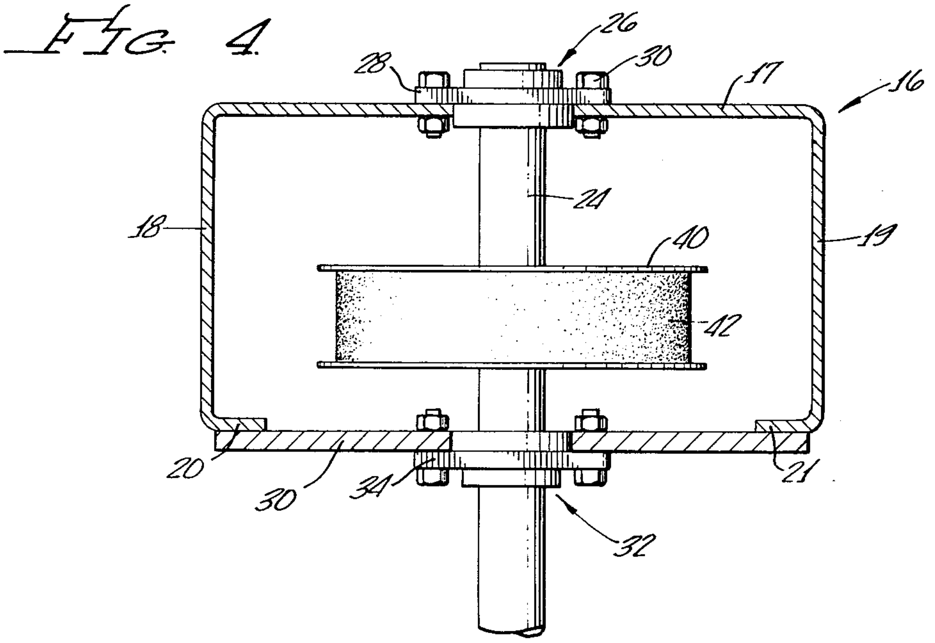
FIG. 4 is a cross-sectional view of the apparatus on line 4—4 of FIG. 3.
Figure 5:
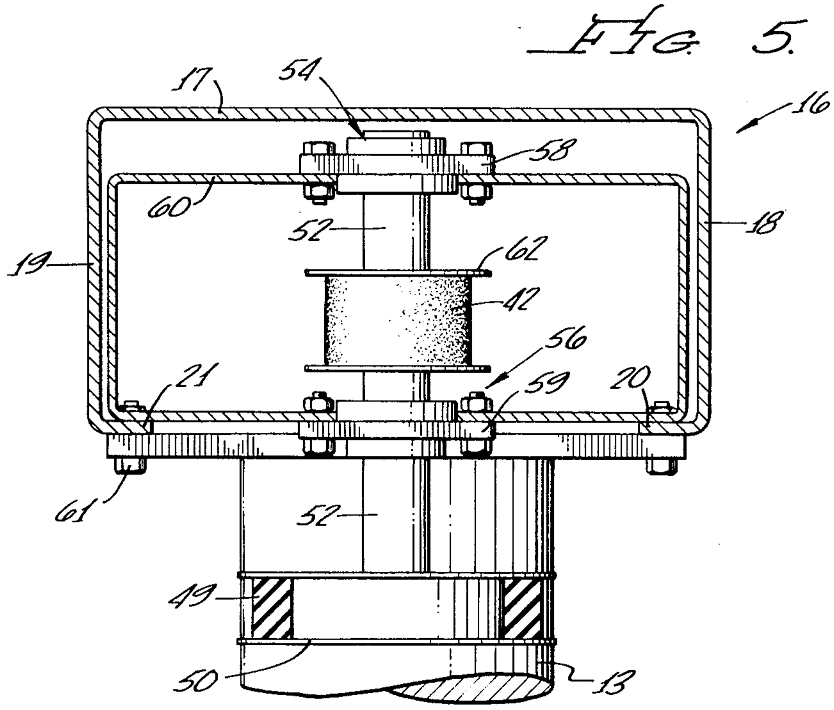
FIG. 5 is a cross-sectional view of the apparatus on line 5—5 of FIG. 3.

Referring to FIG. 3, it may be seen that the column 13 of the pedestal has a flange 22 on its upper end which is attached by suitable bolts 23 to the flanges or stub walls 20 and 21 forming the lower wall of the bridge. If additional supporting surface is desired, a small plate (not shown) may be welded to the lower wall flanges 20 and 21 of the bridge in the area in which the pedestal column 13 is to be attached.

As also seen from FIG. 3, an impeller shaft 24 is supported by the bridge member 16. More specifically, the shaft is supported by an upper bearing assembly 26 which fits within a hole drilled in the upper wall 17 of the bridge, and a flange 28 of the bearing assembly is attached to the upper wall of the bridge by suitable bolts and nuts 30. The shaft is further supported by a lower bearing assembly 32 having a flange 34 which is bolted to a plate 36 which spans the gap 25 between the lower bridge wall flanges 20 and 21 and is attached thereto by welding or other suitable means. A pulley 40 is attached to the shaft 24 between the bearing assemblies. With this spaced bearing system on the upper and lower walls of the bridge member 16, the impeller shaft 24 is firmly supported for handling the loads applied to the impeller 38 attached to its lower end and for handling the driving load transmitted to the shaft by means of a belt 42 on the pulley 40.

To minimize bearing wear and the power requirements for rotating the impeller, it is important that the bearings be accurately aligned with each other. In one approach for insuring proper alignment, the hole through the lower bearing mounting plate 36 is roughly drilled along with holes for receiving the bolts mounting the lower bearing assembly 32 to the plate. The plate is then attached to the bridge in the approximate proper location. The hole in the support plate 36 is then precision drilled or bored and in the same operation a hole for receiving the upper bearing assembly 26 is bored into the upper wall 17 of the bridge. The bearing assemblies are thereby precisely positioned. Holes can then be drilled through the upper bridge wall 17 for receiving the bolts 28 which extend through the bearing flange for securing the upper bearing to the bridge.

In another manufacturing technique for insuring proper alignment of the impeller shaft, the lower bearing mounting plate 36 is attached to the bridge member 16 in the approximate location. Holes for receiving the upper and lower bearings are then cut in the plate and the upper bridge wall with an accuracy, say of one-sixteenth of an inch. The bearings are then properly aligned by means of a pilot hole or other check point formed in the bridge. With the bridge held or clamped in the proper aligned position, the mounting holes for the bearing flanges are then line drilled in both the upper wall 17 of the bridge and the lower bearing mounting plate 36 in the same operation, to insure accuracy. Thus, the bearing assemblies are aligned by the bolt mounting holes rather than by the holes in the bridge and the plate for receiving the bearing assemblies.

An impeller drive assembly 44 is located in the end of the bridge remote from the impeller shaft. As can be seen from FIG. 3, a motor 46 is attached to a plate 48 mounted on the end of the bridge member by welding or other suitable means. The motor shaft 47 extends downwardly and has a pulley 48 mounted thereon driving a belt 49 attached to a speed reduction pulley 50 mounted on a speed reduction transmission shaft 52 which extends upwardly and is mounted in the bridge member 16. More specifically, the shaft 52 is supported by an upper bearing assembly 54 and a lower bearing assembly 56 both of which have outwardly extending flanges 58 and 59 that are bolted to a box-like bearing support frame 60 positioned within and bolted to the lower walls 20 and 21 of the bridge by bolts 61 or other suitable means. The upper and lower bearings 54 and 56 for the speed reduction shaft 52 may be mounted into the bearing frame by either of the two techniques referred to in connection with the impeller shaft 24. A drive pulley 62 mounted on the speed reduction shaft between the two bearings drives the belt 42 linked to the impeller shaft pulley 40. With this arrangement, the speed reduction pulley and shaft are both supported in a very positive fashion which enhances reliability and durability of the apparatus.

In some applications it is desirable that a pedestal support not be utilized and that the bridge be container supported. The same basic bridge member 16 may be utilized for systems in which the bridge is to be supported on the container in which the liquid is being mixed. In that case, the impeller shaft and the motor are centrally mounted on the bridge.

The bridge member is, of course, adaptable to systems wherein the bridge is mounted to be raised, lowered and rotated. Likewise the mounting of auxiliary equipment such as safety devices or controls is facilitated with the one piece bridge member 16, in that mounting holes for such equipment can be accurately formed on a production line basis.

What is claimed is:

1. Industrial apparatus for mixing and dispersing materials within liquids comprising:

a bridge assembly comprising an elongated hollow member made of a single sheet of metal plate formed so that the member has a generally rectangular cross-section throughout its length with a first horizontal wall supporting a first bearing means, two adjoining side walls perpendicular to said first horizontal wall and two horizontal flanges formed integral with the side walls and extending towards each other to define a partial second horizontal wall with an elongated gap between the flanges, an impeller shaft rotatably supported by said first and second bearing means and extending downwardly from said bridge member; and motor means mounted on said bridge member and connected by means extending thru said hollow member to drive said impeller shaft.

2. The apparatus of claim 1 wherein said impeller shaft bearings are mounted on one end of said bridge and said motor means are mounted on the other end of said bridge, and including a pedestal for supporting said bridge assembly, said pedestal being attached to said second horizontal wall of said bridge member between the impeller shaft bearing means and said motor means.

* * * * *

UNITED STATES PATENT OFFICE

CERTIFICATE OF CORRECTION

PATENT NO. : 3,954,025

DATED : May 4, 1976

INVENTOR(S) : Donald M. Schnear

It is certified that error appears in the above-identified patent and that said Letters Patent are hereby corrected as shown below:

Col. 4, line 51 After "flanges,", the words --with means bridging said gap and supporting a second bearing means;-- was omitted.

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*